Dec. 31, 1946.　　　　H. D. BRADY　　　　2,413,541
PLASTIC BRACELET
Filed May 1, 1945

INVENTOR
Hugh D. Brady
By Scott L. Norvell
Attorney

Patented Dec. 31, 1946

2,413,541

UNITED STATES PATENT OFFICE 2,413,541

PLASTIC BRACELET

Hugh D. Brady, Phoenix, Ariz.

Application May 1, 1945, Serial No. 591,251

3 Claims. (Cl. 63—3)

This invention relates to improvements in jewelry, especially bracelets, and the like, made of plastics, and has for its objects, first, the provision of a bracelet made of transparent plastic material having integrally-formed convex lenses on its outer surface arranged to magnify miniature photographs placed in suitable compartments within the body of the bracelet.

A second object is to provide an article of jewelry, such as a bracelet, made of resilient transparent plastic material so as to have ornamental semi-spherical bosses which act as lenses formed on its outer surface, and recesses formed on its inner face adapted to receive and position photographs or the like in optical relation through said lenses, so that they will appear magnified, together with a removable backing clamp adapted to hold these pictures in place.

Other objects will appear hereinafter.

I attain the foregoing objects by means of the structure illustrated in the accompanying drawing, in which—

Figure 1:
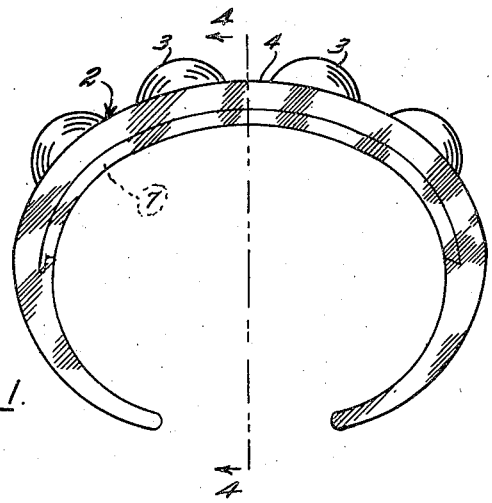
Figure 2:
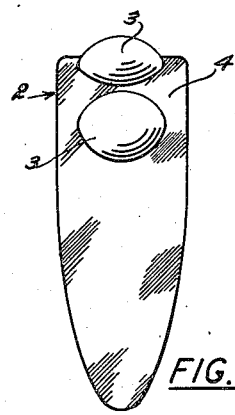
Figure 3:
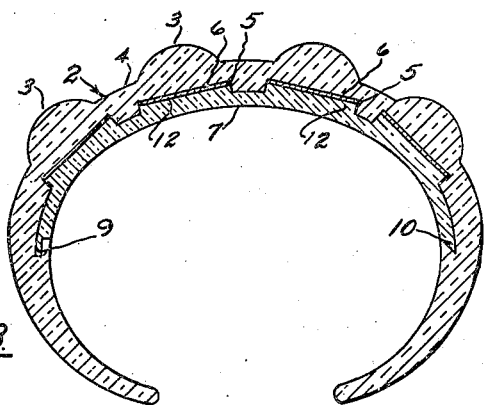
Figure 4:
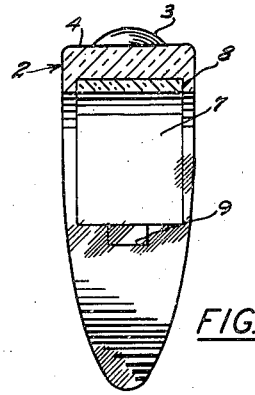
Figure 5:

Figure 1 is an end elevation of my device;

Figure 2, a side elevation;

Figure 3, a vertical section in line 3—3 Fig. 5;

Figure 4, a cross section taken on line 4—4 Figure 1, and

Figure 5 is a plan view of the manufacture, as shown in Figure 1.

Similar numerals refer to similar parts in the several views.

The present embodiment of my device, as here illustrated, is a bracelet, moulded of resilient transparent plastic material such as "Pyralin," "Lucite" or the like.

The body 2 of the bracelet is molded and shaped into the general form shown, but in addition is provided with semi-spherical ornamental bosses 3 protruding from the outer face 4. These bosses form magnifying lenses. Recesses 5 are formed in the inner face opposite each boss a sufficient depth to position a photograph 6 in optical relation to each respective lens so that the image of the photograph will be magnified when viewed from the outer face. As here illustrated, there are four of these magnifying bosses shown. Any suitable number may be provided.

On the inside face of the bracelet body an arched clamp bar 7 of similar material is set into a longitudinal groove 8, and secured at the left end by a tongue 9 fitted into a suitable slotted recess in the bracelet body, and by a beveled tip 10 at the right end. This clamp is proportioned so that it can be sprung into place and will be retained by compression as well as by engagement with the bracelet body at its ends.

Small bosses 12, having flat faces, are formed on the outer face of this bar to register with the recesses 5, and extend into the recess a sufficient distance to press the photographs against the bottom of each recess 5 and maintain it in position.

While I have described the device as made of clear plastic it is obvious that this may be tinted various colors, as desired, so long as the color does not render the material opaque or optically inert. Various other changes and modifications can be made both as to the general construction, as well as to the specific design and placement of the lenses. However, it is essential that the bracelet be made of resilient transparent material which is optically active so as to provide the necessary refraction in the lens bosses.

I claim:

1. As an article of jewelry, a bracelet of transparent resilient plastic material having a body portion with ornamental semi-spherical bosses thereon forming lenses, recesses provided in the inner face of said body portion adjacent each boss adapted to receive and position photographs, or the like, so that they will be magnified when viewed through the lens beneath which they are positioned and a clamp bar removably retained on the inner face of said bracelet body having means for holding said photographs in place in said recesses.

2. An article of jewelry comprising, in combination, a bracelet formed of transparent plastic material, ornamental semispherical bosses formed on its outer face shaped to act as lenses, recesses formed beneath said bosses on the under side of the bracelet body, and a groove formed on said under side adapted to receive a clamp bar, together with photographs positioned in said recesses, and a removable clamp bar resiliently retained within said groove on said bracelet body.

3. An article of jewelry comprising a bracelet having a body formed of transparent resilient plastic having refractory optical properties, ornamental semi-spherical convex lenses formed on its outer surface, spaces for receiving photographs, or the like, formed beneath each lens, photographs positioned in said spaces, a retaining clamp having tongue and slot fastening means adapted to resilient retention within the inner face of said bracelet body and adapted to maintain said photographs in position so they will be magnified when viewed through said lenses.

HUGH D. BRADY.